(12) United States Patent
Habibpour et al.

(10) Patent No.: US 12,024,136 B2
(45) Date of Patent: Jul. 2, 2024

(54) ULTRA-FAST CURING SCRATCH-RESISTANT HEADLIGHT RESTORATION COATING

(71) Applicant: Illinois Tool Works Inc., Glenview, IL (US)

(72) Inventors: Mehdi Habibpour, Glenview, IL (US); Grant Shouldice, Glenview, IL (US)

(73) Assignee: Illinois Tool Works Inc., Glenview, IL (US)

(*) Notice: Subject to any disclaimer, the term of this patent is extended or adjusted under 35 U.S.C. 154(b) by 898 days.

(21) Appl. No.: 17/079,825

(22) Filed: Oct. 26, 2020

(65) Prior Publication Data

US 2021/0129801 A1 May 6, 2021

Related U.S. Application Data

(60) Provisional application No. 62/931,074, filed on Nov. 5, 2019.

(51) Int. Cl.

| | |
|---|---|
| *B60S 1/60* | (2006.01) |
| *C08G 18/83* | (2006.01) |
| *C08K 5/00* | (2006.01) |
| *C09D 151/06* | (2006.01) |
| *C09D 151/08* | (2006.01) |
| *G02B 1/14* | (2015.01) |
| *B60Q 1/04* | (2006.01) |
| *C08K 5/11* | (2006.01) |
| *C08K 5/17* | (2006.01) |

(52) U.S. Cl.
CPC ............ *B60S 1/603* (2013.01); *C08G 18/834* (2013.01); *C08K 5/005* (2013.01); *C09D 151/06* (2013.01); *C09D 151/08* (2013.01); *G02B 1/14* (2015.01); *B60Q 1/04* (2013.01); *C08K 5/11* (2013.01); *C08K 5/17* (2013.01)

(58) Field of Classification Search
CPC ........ B60Q 1/04; B60S 1/603; C08F 290/147; C08F 283/002; C08F 222/1006; C08G 18/834; C08K 5/005; C08K 5/11; C08K 5/17; C08K 5/3435; C09D 4/06; C09D 151/06; C09D 151/08; C09D 175/16; G02B 1/14
USPC .......................... 522/90, 93, 96, 97, 118, 127
See application file for complete search history.

(56) References Cited

U.S. PATENT DOCUMENTS

| | | | |
|---|---|---|---|
| 4,954,591 A | 9/1990 | Belmares | |
| 7,163,446 B1 | 1/2007 | Cole et al. | |
| 8,574,032 B2 | 11/2013 | Norville | |
| 9,427,778 B2 | 8/2016 | Ryan | |
| 9,458,335 B1 | 10/2016 | Sloan | |
| 9,718,095 B2 * | 8/2017 | Ryan | B60S 3/045 |
| 10,883,014 B2 * | 1/2021 | Jang | B05D 3/067 |
| 2002/0132871 A1 | 9/2002 | Colton et al. | |
| 2011/0027472 A1 | 2/2011 | Howell | |
| 2016/0332193 A1 | 11/2016 | Ryan | |
| 2018/0134915 A1 | 5/2018 | Phang et al. | |
| 2019/0264062 A1 | 8/2019 | Jang | |

FOREIGN PATENT DOCUMENTS

WO    2021092122 A1    5/2021

OTHER PUBLICATIONS

Seo et al. Preparation and Properties of Poly(urethane acrylate) Films for Ultraviolet-Curable Coatings. Journal of Applied Polymer Science, vol. 118, 2454-2460 (2010) (Year: 2010).*
Malco Tech Data Sheet, "Headlight Lens Restoration Wipe-On Kit," malcoautomotive.com, Malco Products, Inc., 2015 (2 pp).
M.J. Dvorchak, Allnex USA, Inc., "1K UV-A Hard Coats for Polycarbonate Heat Light Refinishing," 2014 Allnex Belgium SA (8 pp).
Int'l Search Report issued in PCT/US2020/059034, dated Feb. 16, 2021.
SEM Safety Data Sheet for 21013 Solaray UV Clearcoat Aerosol, printed Mar. 14, 2018.

* cited by examiner

*Primary Examiner* — Sanza L. McClendon
(74) *Attorney, Agent, or Firm* — MaxGoLaw PLLC

(57) ABSTRACT

A composition is also provided that includes mercapto modified resin; aliphatic urethane acrylate; a multifunctional crosslinking agent; photoinitiator; and a hindered amine light stabilizer. The composition provides a fast curing coating that utilizes photopolymerization reactions using a variety of light sources such as low energy consuming and environmentally-friendly UV-LED and sunlight. Features of the coating include clarity, hardness, non-yellowing, scratch resistance, and complete surface cure as well as outstanding adhesion to substrates such as plastic, wood, stone and metal.

20 Claims, 1 Drawing Sheet

ULTRA-FAST CURING SCRATCH-RESISTANT HEADLIGHT RESTORATION COATING

RELATED APPLICATIONS

This application claims priority benefit of U.S. Provisional Application Ser. No. 62/931,074 filed 5 Nov. 2019; the contents of which are hereby incorporated by reference.

FIELD OF THE INVENTION

The present invention in general relates to clear coating compositions for restoring auto headlight lenses and process of usage thereof, and in particular to such a composition that is fast curing of the coating compositions by photo polymerization reactions using a variety of light sources such as UV-LED and sunlight.

BACKGROUND OF THE INVENTION

Headlights with an aged, cloudy, or hazy look are becoming increasingly common, as the average age of all cars on the road continues to rise. In addition, most modern vehicles use replaceable bulbs with plastic lenses that are more prone to discoloration, rather than the more-durable glass sealed-beam units. Clouded headlight lenses can pose a serious threat to safety, compromising night vision and reducing the effectiveness of a vehicle's headlights by up to 80 percent. Ultraviolet radiation from the sun is the primary culprit in the headlight aging process, compounded by other environmental factors. Headlight restoration kits are marketed for restoring the headlight lenses to a clear or transparent state.

Currently, the curing times of the headlight restoration compositions reported in the prior art are very long ranging from 30 minutes to 24 hours. The compositions reported in the prior art usually have high concentrations of solvents or are water-based in order to overcome oxygen inhibition and tacky surfaces. Therefore, for curing such compositions, a significantly longer time is required in order for the solvent/water to evaporate. Some of the compositions reported in the prior art benefit and some do not benefit from photopolymerization reactions. The coatings cured by photopolymerization in the prior art, do not possess mechanical properties such as hardness and scratch-resistance required for headlight lens application. To address limitations of windshield cleaning through mechanical squeegee action, hydrophobic glass treatment solutions have been applied to automotive windshields to improve driver vision under high humidity conditions of rain, sleet, or snow.

Representative of such glass treatments are those detailed in U.S. Pat. Nos. 7,163,446; 8,574,032; 9,718,095; 9,427,778; and U.S. Patent Publications US20110027472A1; US20020132871A1; and US20180134915A1. While such glass treatments are effective in restoration, these products have met with limited acceptance owing to the labor-intensive application, and somewhat toxic chemicals needed to be handled to create a surface coating.

Thus, there exists a need for improved formulations that provide ultra-fast curing of hardened and scratch resistant coatings for restoration of headlight lenses.

SUMMARY OF THE INVENTION

A composition is also provided that includes mercapto modified resin; aliphatic urethane acrylate; a multifunctional crosslinking agent; photoinitiator and a hindered amine light stabilizer. The kit is provided in container along with instructions for the removal of any noticeable dirt and debris from a target substrate surface and application of the composition to the substrate as a layer followed by exposing the layer to an actinic source capable curing the layer.

A method of headlight restoration includes the application of an uncured layer of the composition to a cloudy headlight. The uncured layer is exposed to actinic radiation to induce cure of the uncured layer to form a coating in a time of between 2 and 20 minutes that restores the cloudy headlight to transparent. The resulting coating has a pencil hardness of 4H.

BRIEF DESCRIPTION OF THE DRAWINGS

The subject matter that is regarded as the invention is particularly pointed out and distinctly claimed in the claims at the conclusion of the specification. The foregoing and other objects, features, and advantages of the invention are apparent from the following detailed description taken in conjunction with the accompanying drawings wherein like reference numerals refer to like parts throughout the several views, and in which:

DETAILED DESCRIPTION OF THE PREFERRED EMBODIMENTS

Figure 1:
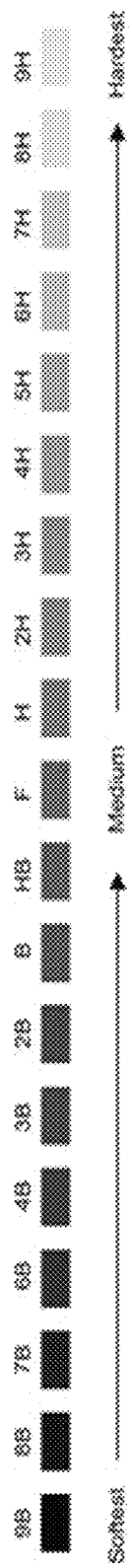
FIG. 1 is a prior art pencil hardness scale used to evaluate the inventive composition in relation to existing compositions.

Clear coating compositions are provided for restoring auto headlight lenses. Embodiments of the inventive compositions provide fast curing coating compositions that utilize photo polymerization reactions using a variety of light sources such as low energy consuming and environmentally-friendly UV-LED and sunlight. The features of the inventive coating include clarity, hardness, non-yellowing, scratch resistance, and complete surface cure as well as outstanding adhesion to substrates such as plastic, wood, stone and metal. In some inventive embodiments, a cloudy headlight is restored from translucent to transparent and even approaching original transparency thereto.

The ultra-fast curing of embodiments of the inventive coating make it possible to restore headlight lenses in as low as three minutes. The significantly fast cure time of the current composition is at least five times faster than the cure times of the compositions reported in the prior art. In addition, the fast cure is achieved at the same time as overcoming oxygen inhibition at the surface preventing tacky surfaces (complete surface cure). Embodiments of the inventive composition of the coating in the present invention are significantly harder and more scratch resistant than coating compositions reported in the prior art. The composition of the current invention is such that it can be cured under the sunlight at the same rate as UV-LED light.

Embodiments of the inventive composition may be used in the 'high volume' professional car care segment that needs a more efficient, time saving, multi-car headlight renewal kit that provides 80% reduction in working time for each headlamp renewal procedure unlike existing professional systems and many do it yourself retail offerings. Embodiments of an inventive kit for professional car care technicians restores the headlamp to at least one condition of original equipment manufacturer clarity, light output, toughness, or a combination thereof; and in some embodiments in from 2 to 20 minutes. For example, the working time, as defined as a combination of light initiation flash time and cure time yet excluding sanding and application) for a prior art product is 20 minutes, whereas for the inventive composition the working time is typically 2 to 10 minutes.

It is further appreciated that while the coating composition of the present invention is largely detailed with respect to polymeric transparent headlight covering, it is appreciated that other suitable target surfaces of usage for the present invention illustratively include a variety of transparent plastics of polycarbonate (PC), polyethylene terephthalate (PET), polyethylene terephthalate glycol-modified (PET-G) or polymethylmethacrylate (PMMA), each independently formed into a sensor lens, a window, a windscreen, an aircraft cowling, swimming goggles, a SCUBA mask, safety glasses/goggles/visors, and electronic display screens. As a result, the present invention has application in variety of fields that illustratively include automotive, aerospace, consumer, safety, motorcycles, ATVs, golf carts, helicopters, and electronics.

The present invention also provides a kit for producing a coating film on a surface substrate to restore optical properties of the substrate. The kit includes an applicator having a nonvolatile layer of the coating composition adhered to the applicator, or the coating composition in a separate bottle for user application to the applicator; along with instructions for contacting the coated applicator with the target surface to produce a coating film on the surface.

Numerical ranges cited herein are intended to recite not only the end values of such ranges but the individual values encompassed within the range and varying in single units of the last significant figure. By way of example, a range of from 0.1 to 1.0 in arbitrary units according to the present invention also encompasses 0.2, 0.3, 0.4, 0.5, 0.6, 0.7, 0.8, and 0.9; each independently as lower and upper bounding values for the range.

Table 1 lists the major components of an embodiment of the inventive curable composition.

TABLE 1

Formulation of a UV curable headlight sealant

| Ingredient | Typical Total Weight Percent | Preferred Total Weight Percent |
| --- | --- | --- |
| Mercapto-modified resin | 10-40 | 20-30 |
| Alphatic urethane acrylate resin | 25-45 | 30-40 |
| Multifunctional cross-linking agent | 2-20 | 5-15 |
| Photoinitiator | 0.5-5 | 1-3 |
| Hindered amine light stabilizer (HALS) | 0.5-5 | 1-3 |
| Additives | Each: 0.5-5 | Each: 1-3 |
| Solvent | Remainder | Remainder |

Mercapto modified resin is typically present in an inventive curable composition from 10 to 40 total weight percent. Without intending to be bound to a particular theory, this resin serves to render the composition curable with UV LED, UVA, low energy lamps, and surprisingly direct sunlight. By way of example, with the thiol containing resin present, only one pass of actinic activation is needed to obtain a surface that cannot be marred with 4H hardness pencil. In contrast, in the absence of the thiol containing resin, surface marring is still present after four like time passes of actinic activation. The result also being noted with direct sunlight cure. It is appreciated that increasing the concentration of the thiol containing resin also increases the rate of composition surface cure. Resins operative herein that include mercapto modification include mercapto-modified polyester acrylate resin and mercapto-modified siloxane resins, both of which are commercially available. It is appreciated that the molecular weight of the mercapto-modified resin is only limited by handling requirements and needed level of flow on a target substrate surface. A range of dynamic viscosities for such a resin at 25° C. are between 5 and 500 mPas.

An actinic radiation curable resin is also present in an inventive composition in the form of an aliphatic urethane acrylate oligomer or polymeric resin. Such resins are readily formed from polyether polyol, a diisocyanate and hydroxyethyl acrylate. The resin typically has a number average molecular weight of 1,000 to 20,000 Daltons. Diisocyanates operative herein illustratively include dicyclohexyl methane diisocyanate, isophorone diisocyanate. It is appreciated that aliphatic urethane acrylate resins are typically sold commercially as a 60 to 85% by weight in a diluent such as trimethylolpropane triethoxy triacrylate, pentaerythritol tri/tetracrylate, or the like. Still other actinic radiation curable resins operative herein are detailed in U.S. Pat. No. 5,908,873.

A crosslinking agent that is multifunctional is also present in an inventive composition. As used herein, multifunctional is defined as a compound that has a polymerizable functionality of at least 2. Difunctional crosslinking agents are particularly well suited for use in the present invention. Crosslinking agents operative in the present invention illustratively include diallyl fumarate, diallyl diglycol carbonate, allyl methacrylate, diallyl phthalate, diallyl suberate, diallyl tetrabromophthalate, diethylene glycol diacrylate, diethylene glycol dimethacrylate, diethylene glycol divinyl ether, N,N'-dimethacryloylpiperazine, 2,2-dimethylpropanediol dimethacrylate, dipentaerythritol pentaacrylate, dipropylene glycol dimethacrylate, di-trimethylolpropane tetraacrylate, divinyl glycol, divinyl sebacate, glycerol trimethacrylate, 1,5-hexadiene, 1,6-hexanediol diacrylate, 1,6-hexanediol dimethacrylate, N,N'-methylenebismethacrylamide, 1,9-nonanediol dimethacrylate, pentaerythritol tetraacylate, pentaerythrtol triacrylate, pentaerythritol triallyl ether, 1,5-pentanediol dimethacrylate, poly(propylene glycol) dimethacrylate, tetraethylene glycol dimethacrylate, triethylene glycol diacrylate, triethylene glycol dimethacrylate, triethylene glycol divinyl ether, 1,1,1-trimethylolethane trimethacrylate, 1,1,1-trimethylolpropane diallyl ether, 1,1,1-trimethylolpropane triacrylate, 1,1,1-trimethylolpropane trimethacrylate, tripropylene glycol diacrylate, 1,2,4-trivinylcyclohexane, divinyl benzene, bis(2-methacryloxyethyl) phosphate, 2,2-bis(4-methacryloxyphenyl)propane, 1,3-butanediol diacrylate, 1,4-butanediol diacrylate, 1,3-butanediol dimethacrylate, 1,4-butanediol dimethacrylate, 1,4-butanediol divinyl ether, 1,4-cyclohexanediol dimethacrylate, bis[4-(vinyloxy)butyl]isophthalate, bis[4-(vinyloxymethyl)cyclohexylmethyl]glutarate, bis[-(vinyloxy) butyl]succinate, bis((4-((-vinyloxy)methyl)cyclohexyl) methyl)isophthalate, bis(4-(vinyloxy)butyl)terephthalate, bis[[(4-[vinyloxy)methyl]cyclohexyl]methyl]terephthalate, bis[4-vinyloxy)butyl]adipate, bis[4-(vinyloxy)butyl](methylenedi-1,4-phenylene)biscarbamate, bis-[4-(vinyloxy)butyl](4-methyl-1,3-phenylene)biscarbamate, bis[4-(vinyloxy)butyl]1,6-hexanediylbiscarbamate, tris[4-(vinyloxy)butyl]trimellitate or combinations thereof. It is appreciated that a minority amount of trifunctional or higher functional crosslinking agent present modifies the cured coating properties.

In order to achieve enhanced rates of actinic cure, a photoinitiator is present from 0.5 to 5 total weight percent. Bisacylphosphine oxides (BAPO) are exemplary of a photoinitiator operative in the present invention. Specific bisacylphosphine oxides operative herein illustratively include phenyl bis(2,4,6-trimethylbenzoyl)-phosphine oxide, diphenyl(2,4,6-trimethylbenzoyl)phosphine oxide, bis-(2,6-dichlorobenzoyl)phenylphosphine oxide, bis-(2,6-dichlorobenzoyl)-2,5-dimethylphenylphosphine oxide, bis-(2,6-dichlorobenzoyl)-4-ethoxyphenylphosphine oxide, bis-(2,6-dichlorobenzoyl)-4-biphenylylphosphine oxide, bis-(2,6-dichlorobenzoyl)-4-propylphenylphosphine oxide, bis-(2,6-dichlorobenzoyl)-2-naphthylphosphine oxide, bis-(2,6-dichlorobenzoyl)-1-napthylphosphine oxide, bis-(2,6-dichlorobenzoyl)-4-chlorophenylphosphine oxide, bis-(2,6-dichlorobenzoyl)-2,4-dimethoxyphenylphosphine oxide, bis-(2,6-dichlorobenzoyl)decylphosphine oxide, bis-(2,6-dichlorobenzoyl)-4-octylphenylphosphine oxide, bis-(2,6-dimethoxybenzoyl)-2,5-dimethylphenylphosphine oxide bis-(2,6-dimethoxybenzoyl)phenylphosphine oxide, bis-(2,4,6-trimethylbenzoyl)-2,5-dimethylphenylphosphine oxide, bis-(2,6-dichloro-3,4,5-trimethoxybenzoyl)-2,5-dimethylphenylphosphine oxide, bis-(2,6-dichloro-3,4,5-trimethoxybenzoyl)-4-ethoxyphenylphosphine oxide, bis-(2-methyl-1-naphthoyl)-2,5-dimethylphenylphosphine oxide, bis-(2-methyl-1-naphthoyl)phenylphosphine oxide, bis-(2-methyl-1-naphthoyl)-4-biphenylphosphine oxide, bis-(2-methyl-1-naphthoyl)-4-ethoxyphenylphosphine oxide, bis-(2-methyl-1-naphthoyl)-2-naphthylphosphine oxide, bis-(2-methyl-1-naphthoyl)-4-propylphenylphosphine oxide, bis-(2-methyl-1-naphthoyl)-2,5-dimethylphosphine oxide, bis-(2-methoxy-1-naphthoyl)-4-ethoxyphenylphosphine oxide, bis-(2-methoxy-1-naphthoyl)-4-biphenylylphosphine oxide, bis-(2-methoxy-1-naphthoyl)-2-naphthylphosphine oxide, bis-(2-chloro-1-naphthoyl)-2,5-dimethylphenylphosphine oxide, and combinations thereof. In some inventive embodiments, liquid blends of photoinitiators are provided by dissolving solid bisacylphosphine oxide photoinitiator in another liquid photoinitiator or a photoinitiator blend which is of liquid form.

A hindered amine light stabilizer (HALS) is present from 0.5 to 5 total weight percent. HALS operative herein illustratively include bis-(1,2,2,6,6-pentamethyl-4-piperidyl) sebacate, bis-(2,2,6,6-tetramethyl-4-piperidinyl) sebacate, bis-(N-methyl-2,2,6,6-tetramethyl-4-piperidinyl) sebacate, 4-benzoyloxy-2,2',6,6'-tetramethylpiperidine, bis-(1,2,2,6, Monomer type such as 6-pentamethyl-4-piperidyl){[3,5-bis-(1,1-dimethylethyl)-4-hydroxyphenyl]methyl}butyl malonate; poly{[6-(1,1,3,3-tetramethylbutyl)imino-1,3,5-triazine-2,4-diyl], [(2,2,6,6-tetramethyl-4-piperidyl) imino] hexamethylene Oligomer type such as (2,2,6,6-tetramethyl-4-piperidyl) iminol]}; 4-hydroxy-2,2,6,6-tetramethyl-1-piperidineethanol; and combinations thereof.

A solvent is selected to solubilize the other composition components. In some inventive embodiments the solvent is also chosen to presensitize the composition to actinic activation. Solvents operative herein illustratively include 1-methoxy-2-propanol, methanol, butanol, ethylene chloride, chlorobenzene, tetrahydrofuran, acetone, methyl ethyl ketone, cyclohexanone, ethyl acetate, butyl acetate, ethyl lactate, ethylene glycol monomethyl ether (methyl cellosolve), ethylene glycol monoethyl ether (ethyl cellosolve), dimethylformamide, dimethyl sulfoxide, 7-butyrolactone, diacetone alcohol, and miscible combinations thereof. The solvent constitutes the remainder of the composition.

Several additives are readily included in an inventive formulation that illustratively include light and heat stabilizers to maintain clarity of the cured adhesives, adhesion promoters, flow control additives, pigments and dyes and combinations thereof. Generally, each of the aforementioned additives is independently present from 0.5 to 5 total weight percent.

A kit for application of an inventive composition includes a container of a composition per Table 1, the container being in the form of a bottle, a pressurized aerosol with the propellant therein not being counted toward the above weight percentages, or a towelette saturated with the composition. The kit optional includes gloves to preclude topical exposure, the gloves illustratively being vinyl or nitrile or other materials compatible with contact with an inventive composition. In some inventive embodiments, the kit includes an applicator pad. In still other inventive embodiments, lint free shop towels. Instructions are further provided for the removal of any noticeable dirt and debris from the target substrate surface, such as a headlight. Besides cleaning with lint free towels, conventional solvent cleaners based on water or $C_1$-$C_{12}$ alcohols are provided in a bottle, the cleaner used to clean the substrate surface. Upon air drying, the inventive composition is applied as a liquid. Ideally, the application occurs while wearing gloves. The working time is then commenced and begins by exposing the film of inventive composition to an actinic source to initiate cure.

It is appreciated that the composition is readily reapplied as many times as necessary, either before or after initiation of cure.

While generally not needed, the resulting cured coating is amenable to sanding or polishing. Regardless of whether a post-cure treatment occurs clouded transparent plastics such as headlight lenses are restored to a condition approaching original transparency.

The present invention is further detailed with respect to the following non limiting examples. These examples are not intended to limit the scope of the invention but rather highlight properties of specific inventive embodiments and the superior performance thereof relative to comparative examples.

EXAMPLES

Example 1

A comparison test was conducted to determine hardness of competing compositions. The results are summarized in Table 2. FIG. 1 shows the standard pencil hardness scale. The inventive composition being based on a mercapto-modified polyester acrylate resin (20%), an alphatic urethane acrylate resin (35%), a difunctional crosslinking agent (10%), a BAPO photoinitiator (1%), a hindered amine light stabilizer (1%), and the remainder being 1-methoxy-2-proponal. The inventive composition was cured for 4 minutes and the MALCO® comparative formulation was cured for 15 minutes.

TABLE 2

Pencil hardness measure

| | Inventive Composition | Comparative Example - MALCO® Headlight Restoration Wipe-On Kit #193957 | Control- Polycarbonate Substrate |
|---|---|---|---|
| Hardness Class | 4H Very hard | 3B Soft | 2B Soft |

As shown the inventive composition achieved a higher hardness than a prior art composition.

These examples demonstrate the processes to be claimed in this patent filing. It should be remarked that other additions and modifications as known in the art are also expected to be covered.

Patent documents and publications mentioned in the specification are indicative of the levels of those skilled in the art to which the invention pertains. These documents and publications are incorporated herein by reference to the same extent as if each individual document or publication was specifically and individually incorporated herein by reference.

The invention claimed is:

1. A headlight restoration composition comprising:
a mercapto modified resin consisting of mercapto-modified polyester acrylate resin, mercapto-modified siloxane resin, or a combination thereof;
an acrylate resin;
a multifunctional crosslinking agent;
a photoinitiator reactive to ultraviolet light and being a bisacylphosphine oxide; and
a hindered amine light stabilizer;
wherein the composition light cures to a pencil hardness of 4H.

2. The composition of claim 1 wherein said mercapto-modified polyester acrylate resin is present.

3. The composition of claim 1 wherein said mercapto modified resin is present from 10 to 40 total weight percent.

4. The composition of claim 1 wherein said aliphatic urethane acrylate resin is present from 25 to 45 total weight percent.

5. The composition of claim 1 wherein said multifunctional crosslinking agent resin is difunctional.

6. The composition of claim 1 wherein said multifunctional crosslinking agent resin is a diacrylate.

7. The composition of claim 1 wherein said multifunctional crosslinking agent resin is present from 2 to 20 total weight percent.

8. The composition of claim 1 wherein said solvent comprises 1-methoxy-2-propanol.

9. The composition of claim 1 further comprising at least one additive of a heat stabilizer, an adhesion promoter, a flow control additive, a pigment, a dye, or combinations of any of the aforementioned.

10. The composition of claim 9 wherein each of the aforementioned additives is independently present from 0.5 to 5 total weight percent.

11. A kit comprising:
a container of a composition according to claim 1; and
instructions for the removal of any noticeable dirt and debris from a target substrate surface and application of the composition to the substrate as an uncured layer and actinic radiation source exposure to cure the layer to a hard coating.

12. The kit of claim 11 wherein the target substrate surface is a vehicle headlight.

13. The kit of claim 12 wherein said container being in the form of one of: a bottle, a pressurized aerosol can, or a towelette saturated with the composition.

14. The kit of claim 12 further comprising gloves.

15. The kit of claim 12 further comprising applicator pad.

16. The kit of claim 12 further comprising lint free shop towels.

17. The kit of claim 12 further comprising a bottle of cleaning solvent.

18. A method of headlight restoration comprising:
applying an uncured layer of the composition according to claim 1 a cloudy headlight;
exposing the uncured layer to actinic radiation to induce cure of the uncured layer to form a coating in a time of between 2 and 20 minutes that restores the cloudy headlight to transparent.

19. The composition of claim 1 wherein said photoinitiator is present from 0.5 to 5 total weight percent.

20. The composition of claim 1 wherein said bisacylphosphine oxide (BAPO) is selected from the group consisting of: phenyl bis-(2, 4, 6-trimethylbenzoyl)-phosphine oxide, diphenyl(2,4,6-trimethylbenzoyl)phosphine oxide, bis-(2,6-dichlorobenzoyl)phenylphosphine oxide, bis-(2,6-dichlorobenzoyl)-2,5-dimethylphenylphosphine oxide, bis-(2,6-dichlorobenzoyl)-4-ethoxyphenylphosphine oxide, bis-(2,6-dichlorobenzoyl)-4-biphenylylphosphine oxide, bis-(2,6-dichlorobenzoyl)-4-propylphenylphosphine oxide, bis-(2,6-dichlorobenzoyl)-2-naphthylphosphine oxide, bis-(2,6-dichlorobenzoyl)-1-napthylphosphine oxide, bis-(2,6-dichlorobenzoyl)-4-chlorophenylphosphine oxide, bis-(2,6-dichlorobenzoyl)-2,4-dimethoxyphenylphosphine oxide, bis-(2,6-dichlorobenzoyl)decylphosphine oxide, bis-(2,6-dichlorobenzoyl)-4-octylphenylphosphine oxide, bis-(2,6-dimethoxybenzoyl)-2,5-dimethylphenylphosphine oxide bis-(2,6-dimethoxybenzoyl)phenylphosphine oxide, bis-(2,4,6-trimethylbenzoyl)-2,5-dimethylphenylphosphine oxide, bis-(2,6-dichloro-3,4,5-trimethoxybenzoyl)-2,5-dimethylphenylphosphine oxide, bis-(2,6-dichloro-3,4,5-trimethoxybenzoyl)-4-ethoxyphenylphosphine oxide, bis-(2-methyl-1-naphthoyl)-2,5-dimethylphenylphosphine oxide, bis-(2-methyl-1-naphthoyl)phenylphosphine oxide, bis-(2-methyl-1-naphthoyl)-4-biphenylphosphine oxide, bis-(2-methyl-1-naphthoyl)-4-ethoxyphenylphosphine oxide, bis-(2-methyl-1-naphthoyl)-2-naphthylphosphine oxide, bis-(2-methyl-1-naphthoyl)-4-propylphenylphosphine oxide, bis-(2-methyl-1-naphthoyl)-2,5-dimethylphosphine oxide, bis-(2-methoxy-1-naphthoyl)-4-ethoxyphenylphosphine oxide, bis-(2-methoxy-1-naphthoyl)-4-biphenylylphosphine oxide, bis-(2-methoxy-1-naphthoyl)-2-naphthylphosphine oxide, bis-(2-chloro-1-naphthoyl)-2,5-dimethylphenylphosphine oxide, and combinations thereof.

* * * * *